United States Patent

Lopez et al.

Patent Number: 5,822,467
Date of Patent: Oct. 13, 1998

[54] SHARPENING FILTER FOR IMAGES WITH AUTOMATIC ADAPTATION TO IMAGE TYPE

[75] Inventors: Patricia D. Lopez; Hal Hansen, both of Loveland; Jeffrey P. Lee, Greeley, all of Colo.

[73] Assignee: Hewlett-Packard Company, Palo Alto, Calif.

[21] Appl. No.: 773,428

[22] Filed: Dec. 27, 1996

[51] Int. Cl.[6] .................. G06K 9/36; C06T 5/00; H04N 1/409
[52] U.S. Cl. ............................ 382/261; 382/263
[58] Field of Search .................... 382/261, 263, 382/264, 260, 266; 358/447

[56] References Cited

U.S. PATENT DOCUMENTS

| | | | |
|---|---|---|---|
| 5,245,445 | 9/1993 | Fujisawa | 382/261 |
| 5,381,490 | 1/1995 | Shin | 382/266 |
| 5,485,534 | 1/1996 | Takemoto et al. | 382/263 |
| 5,497,249 | 3/1996 | Koizumi et al. | 382/263 |

*Primary Examiner*—Scott Rogers
*Attorney, Agent, or Firm*—Augustus W. Winfield

[57] ABSTRACT

A method of filtering images with a filter that is dependent on image type. For binary images, a fixed Laplacian filter is used for all pixels. For non-binary images, an automatic level-sensitive Laplacian filter is used. For non-binary images, Laplacian filter coefficients and normalization divisors are made a function of intensity on a pixel by pixel basis. Pixels indicating a high intensity may be greatly changed by neighboring pixels. Pixels indicating a low intensity receive relatively little or no filtering. In a specific example embodiment, the intensity range is divided to bands, with a different filter for each band. The resulting images are visually sharpened (edge enhanced) with very little impact in darker areas of the image.

2 Claims, 2 Drawing Sheets

SHARPENING FILTER FOR IMAGES WITH AUTOMATIC ADAPTATION TO IMAGE TYPE

FIELD OF INVENTION

This invention relates generally to computerized image processing and more specifically to spatial filtering, kernel operations and Laplacian operators.

BACKGROUND OF THE INVENTION

Digital cameras, image scanners, copiers, facsimile machines and other devices provide images in an electronic form suitable for transmission, printing or storage. Picture elements (pixels) are represented numerically as intensity values or coordinates in a color space. Once images are acquired in computer readable form, they may be "processed" to remove distortions, to reduce noise, to modify color, to accentuate outlines, and so forth. This patent document is primarily concerned with spatial filters, also called kernel operations or convolution kernels. Of specific interest are Laplacian operators, also called sharpening filters. With Laplacian operators, pixel values may be modified by the values of neighboring pixels. With uniform intensity, no modification occurs. However, in areas of changing intensity, the Laplacian operation results in an exaggeration of the change. Laplacian operators may be viewed as spatial differentiators, or spatial high-pass filters. Visually, they improve image contrast at edges, making edges easier for the viewer to see, making an image appear sharper. For a general tutorial overview of image processing, see, for example, Ross, John C., *The Image Processing Handbook,* 2nd Edition (1995), CRC Press, Inc. Laplacian operators are discussed in Ross at pages 225–232.

Images obtained by digital cameras and image scanners generally have some unavoidable noise. Photosensors have a finite background signal level even when no light is received by the photosensors (sometimes called fog level or dark current). There may be thermal noise, synchronous electronic noise, and quantization banding due to limited precision in analog-to-digital conversion. Also, sensitivity (voltage change/light intensity) varies from photosensor element to photosensor element. In general, digital cameras and image scanners perform calibration processes to reduce the effects of background (dark) signals and variable sensitivity, but calibration rarely completely eliminates variability.

The sensitivity of the human visual system to light intensity is approximately logarithmic. That is, the human visual system is very sensitive to intensity changes in dark areas and shadow areas and the sensitivity to intensity change decreases with increasing intensity. Therefore, for a fixed level of noise, the noise is visually more apparent in the dark areas of an image. For example, in a line scanner, if one photosensor element within a row of photosensitive elements is more sensitive than neighboring photosensor elements, the resulting digitized image may have a light vertical line. This line may not be visible in light areas of the image but may be visible and objectionable in the darker areas of an image. However, sensitivity to spatial detail decreases with decreasing intensity. Therefore, low-pass filtering of an image can suppress some objectional noise in the darker areas of the image with relatively little visual impact on the spatial detail in the darker areas.

A Laplacian operator, while providing useful edge enhancement in light areas of an image, also accentuates noise in the dark areas of an image. For example, a light vertical line, as described above, might not be visible in a dark area before application of the Laplacian operator but may be made visible by application of the Laplacian operator. Similarly, a gray area having a relatively smooth appearance before application of a Laplacian operator may appear nonuniform or noisy after application of the Laplacian operator.

For some images, there is a need for image sharpening without accentuating noise in the dark areas of the image. However, for some types of images, edge sharpening is important, regardless of any noise effects within the dark areas. In binary images, for example, line art and text, the scanned counterparts are typically substantially improved by edge sharpening. In many cases, scanning of binary images is done with multiple bits per pixel, edge sharpening and other filtering is performed, and the resulting filtered images are then "thresholded" to binary levels. The interior of a dark area, even if somewhat noisy, may be returned to solid black during thresholding operations.

SUMMARY OF THE INVENTION

If an operator selects a feature called auto-sharpening, an automatic filtering operation is provided in which an appropriate level of sharpening is determined based on an image type. For binary images, uniform filtering is applied to all areas of the image. For other images, the degree of sharpening is made a function of intensity on a pixel by pixel basis as follows. For each pixel, the central filter coefficient and the normalization divisor are made a function of intensity. Pixels with low intensity receive relatively little or no filtering. That is, for pixels in dark areas, the influence of neighboring pixels is relatively small. Pixels with higher intensity receive relatively more filtering. In a specific example embodiment, the intensity range is divided into bands, with a different filter for each band. The resulting images are visually sharpened (edge enhanced) with very little impact in darker areas of the image.

DETAILED DESCRIPTION OF THE PREFERRED EMBODIMENT OF THE INVENTION

Figure 1A:
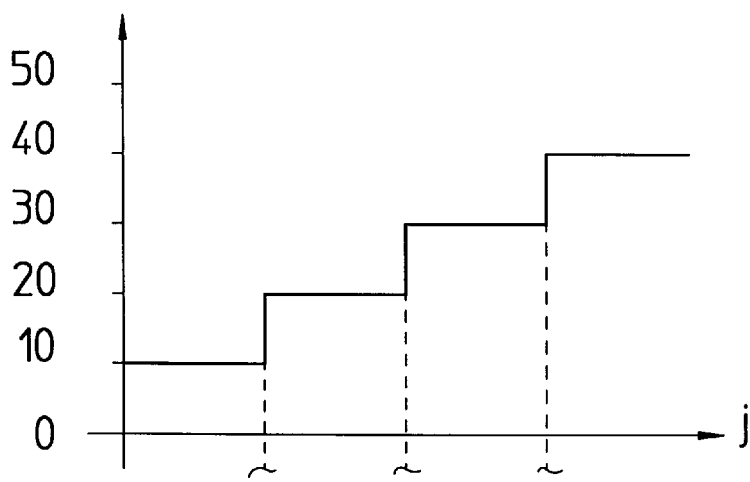
FIG. 1A is a graph of pixel value versus pixel number for an example row of pixels.

The following array of numbers represents pixel values P(i,j) in a two dimensional image. Assume for illustration that pixels having low numerical values are dark and pixels having high numerical values are light. FIG. 1A is a graph of row number 2 (i=2) as a function of column number (j).

| | |
|---|---|
| i = 1 | 10 10 10 10 20 20 20 20 30 30 30 30 40 40 40 |
| i = 2 | 10 10 10 10 20 20 20 20 30 30 30 30 40 40 40 |
| i = 3 | 10 10 10 10 20 20 20 20 30 30 30 30 40 40 40 |
| j = | 1 2 3 4 5 6 7 8 9 10 11 12 13 14 15 |

In the following example, Laplacian filters are a matrix of coefficients having the following general form:

|                          |
|--------------------------|
| −1/K                     |
| −1/K  (K + 4)/K  −1/K    |
| −1/K                     |

For each pixel P(i,j), the computation is as follows:

$$P(i,j)=[(K+4)*P(i,j)-P(i+1,j)-P(i,j-1)-P(i,j+1)-P(i-1,j)]/K$$

For example, consider P(2,5) highlighted above and K=2.

|                                              |
|----------------------------------------------|
| P(2,5) = [6*P(2,5) − P(1,5) − P(2,4) − P(2,6) − P(3,5)]/2 |
| = [120 − 20 − 10 − 20 − 20]/2 = 25           |

As a result of applying the Laplacian operation, the value of P(2,5) is changed from 20 to 25. The following numbers represent row 2 above after application of a fixed Laplacian operator with K=2 (the edge pixels are not filtered).

| i = 2 | 10 10 10  5 25 20 20 15 35 30 30 25 45 40 40 |
|-------|----------------------------------------------|
| j =   |  1  2  3  4  5  6  7  8  9 10 11 12 13 14 15 |

Figure 1B:
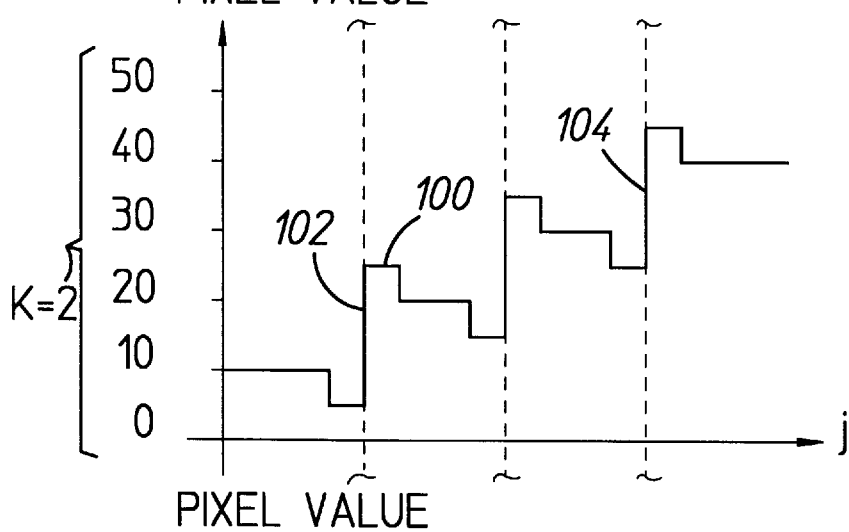
FIG. 1B is a graph of the pixel values of FIG. 1A as modified by a fixed Laplacian operator.

FIG. 1B is a graph of row number 2 above after application of a fixed Laplacian operator with K=2. Reference number 100 in FIG. 1B designates P(2,5) used for the above numerical example. Note that steps in intensity in the original image (FIG. 1A) result in an undershoot followed by an overshoot in the filtered image (FIG. 1B). As a result, steps in intensity having an increment of 10 in FIG. 1A have an increment of 20 in FIG. 1B. That is, intensity steps or edges or boundaries are exaggerated. Note in FIG. 1B that steps between numerical pixel values of 10 and 20 (reference number 102) are exaggerated exactly the same amount as steps between numerical pixel values of 30 and 40 (reference number 104). Since the human visual system is logarithmic, the exaggerated intensity step 102 in a relatively dark area will appear to be much greater than the exaggerated intensity step 104 in a relatively light area.

Laplacian operations are destructive, so a copy of each original numerical pixel value must be stored long enough to ensure that the computation is performed on original pixel values, not modified pixel values. In addition, special rules are required for the outer edges of the image. For example, for the 3×15 sample image above, special rules are required for rows 1 and 3 and for columns 1 and 15. Artificial boundaries may be created by appending additional rows and columns (for example for the 3×15 sample image, by adding a row −1, a row 0, a row 4 and a row 5 and by adding a column −1, a column 0, a column 16 and a column 17), or one may simply choose to not perform the filtering operation for pixels adjacent to a boundary.

In a specific example embodiment below, values of K are 1, 2, 4 and 8. With K=8, a pixel value is changed relatively little by neighboring pixels (weak filter). With K=1, a pixel value may be changed substantially by neighboring pixels (strong filter). Choosing integral powers of two for K enables the normalizing division by K to be performed by a microprocessor shift instruction.

In a specific example embodiment, an imaging system operator may select a feature called auto-sharpening. When auto-sharpening is selected, a Laplacian operator is applied to the image as discussed above. For binary images, K is fixed at a value of one (substantial sharpening) or two (less sharpening), depending on the quality of the original image. That is, K is one (substantial sharpening) for clean images and K is two (less sharpening) for noisy images. For non-binary images, for each pixel being filtered, the value of K is dependent on the numerical value of the pixel before filtering. For example, consider the following relationships:

If P(i,j)≦10 then K=8
If 10<P(i,j)≦20 then K=4
If 20<P(i,j)≦30 then K=2
If 30<P(i,j)≦40 then K=1

The following numbers represent original row 2 above after application of a variable Laplacian operator with K=1, 2, 4 or 8 according to the above example relationships (the edge pixels are not filtered and the values are rounded).

| i = 2 | 10 10 10  9 23 20 20 18 35 30 30 25 50 40 40 |
|-------|----------------------------------------------|
| j =   |  1  2  3  4  5  6  7  8  9 10 11 12 13 14 15 |

Figure 1C:
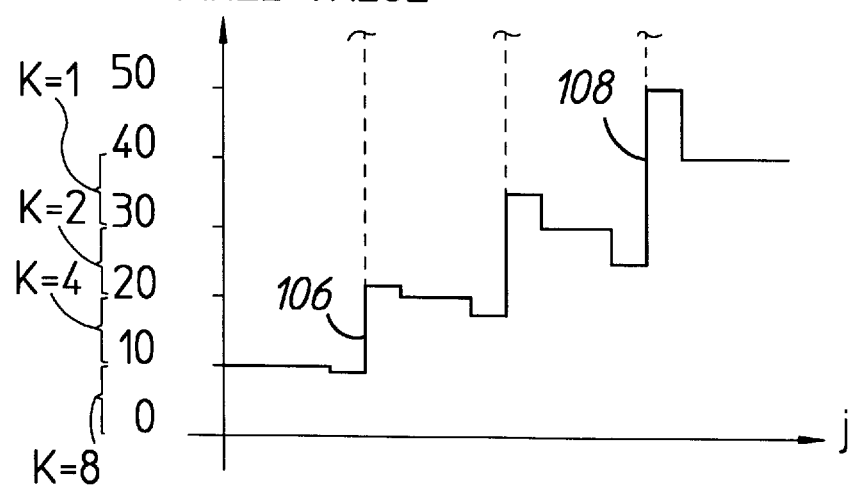
FIG. 1C is a graph of the pixel values of FIG. 1A as modified by a variable Laplacian operator in accordance with the invention.

FIG. 1C is a graph of original row 2 above after application of a variable Laplacian operator with K=1, 2, 4 or 8 according to the above relationships. Note that steps in intensity in the darker areas (106) are barely exaggerated whereas steps in the lighter areas (108) are greatly exaggerated. For many images, application of a variable Laplacian operator as illustrated above results in a perceptible improvement in sharpness without accentuating noise in the dark areas of the image.

In a specific example embodiment of the invention, an operator of an imaging device is permitted to select from a range of sharpening filters called light, normal, heavy and extra heavy, corresponding to K=8, 4, 2 and 1 respectively. The original intensities from the photosensors are modified by a logarithmic function to approximate the human visual response (called Gamma correction). For example, for a Gamma corrected intensity range of 0–255, where 0 is the lowest numerical intensity (darkest) and 255 is the highest numerical intensity (brightest), thresholds may be set at 20, 40, 60 and 80. The relationship between individual Gamma corrected pixel intensity and filter value is then as follows:

| | |
|---|---|
| If 80 ≦ P(i,j) | then use the operator selected filter weight. |
| If 60 ≦ P(i,j) < 80 | then use the filter weight one step lighter than operator selected filter weight. |
| If 40 ≦ P(i,j) < 60 | then use the filter weight two steps lighter than operator selected filter weight. |
| If 20 ≦ P(i,j) < 40 | then use the filter weight three steps lighter than operator selected filter weight. |

That is, the operator selected weight is used for the highest numerical intensity (brightest) Gamma corrected intensity values, the next lightest filter (or none) is used for the 20 next darker Gamma corrected intensity values, and so forth. For example, if the operator selects normal filtering, the highest numerical intensities (brightest) are filtered with K=4, the 20 next darker intensities are filtered with K=8, and the 60 darkest intensities are not filtered at all.

For color, the above variable filter approach may be used on each color coordinate if appropriate (for example, red, green, blue) or may be used on just the intensity coordinate for color spaces having a separate coordinate equivalent to intensity. For example, in a hue, saturation, lightness color space, variable filters may be applied to the lightness coordinate only.

Laplacian filters may have diagonal elements. They may be larger than three by three. They may be combined with other filters to provide low pass filtering before sharpening or to provide other processing combined with sharpening. A sharpened image may be subtracted from an original image (used to "unblur" an image).

Now consider binary images, for example, black and white line art. Ideally, any pixel for a black and white binary image is either black or white. However, during scanning, a scanning pixel may slightly straddle a boundary between white and black. In addition, printing inks may not uniformly fill in all the black areas, some ink scatter may occur outside the black areas, or images may be "noisy" for other reasons. In a specific example embodiment of the invention, binary images are scanned with multiple bits per pixel. If auto-sharpening is selected, a sharpening filter is applied to the multiple-bit-per-pixel image. Finally, an intensity threshold is selected and pixels having a numerical value greater than or equal to the threshold are snapped to a maximum numerical value and pixels having a numerical value less than the threshold are snapped to a minimum numerical value. In the invention, the sharpening filter for binary images is fixed. In the specific example embodiment, the filter is fixed with K equal to one. From the above discussion, the filter may exaggerate some noise. However, if the filter does not generate pixel values that cross the threshold, the thresholding operation will still snap the noise values back to the maximum or minimum numerical values. For example, consider a pixel that in theory should be black but instead is gray and surrounded by black pixels. The filter may turn some of the surrounding pixels gray (overshoot and undershoot). However, as long as none of the gray pixels exceed the threshold, they will be snapped to black. Therefore, noise is less of a problem for binary images, but is heavily dependent on the quality of the original image.

Figure 2:
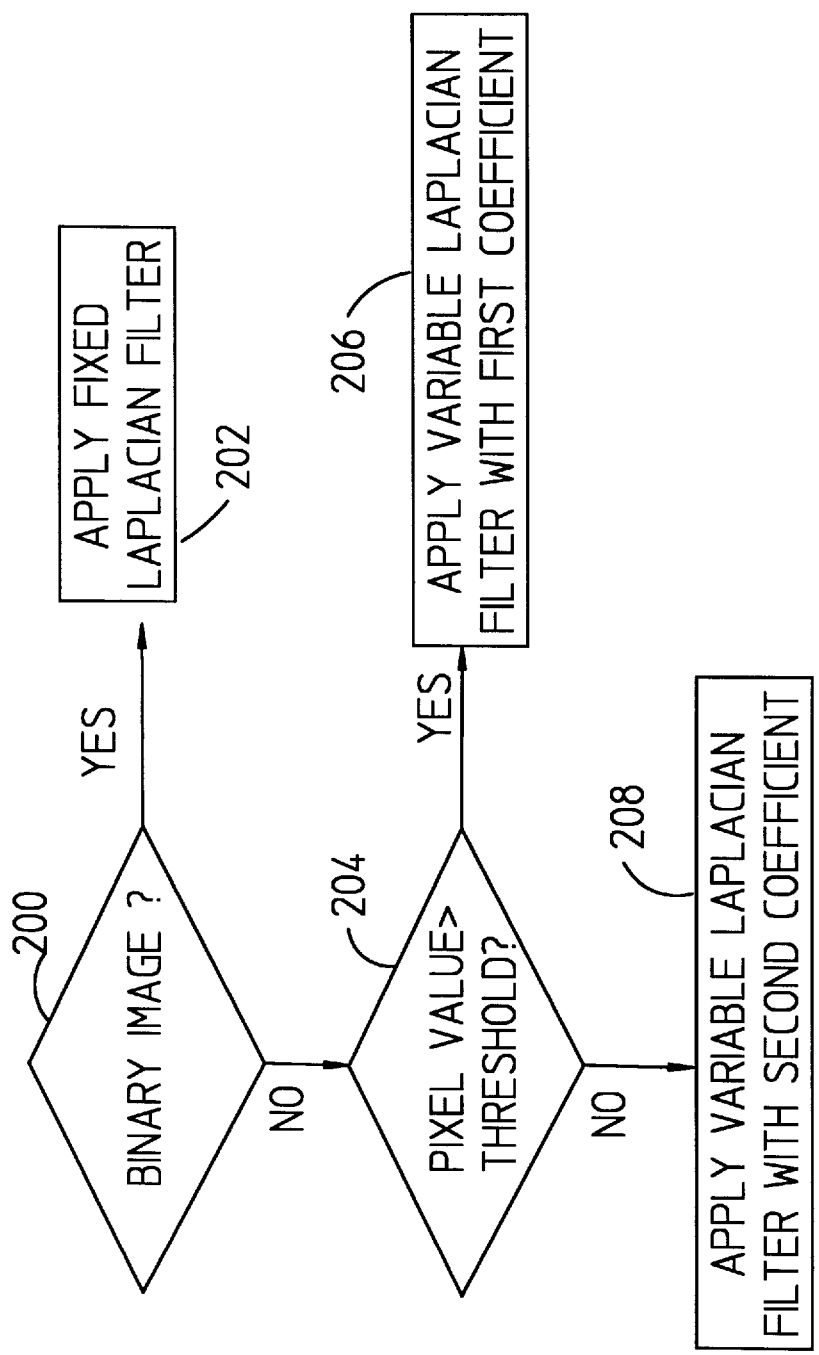
FIG. 2 is a flow chart of a method of determining a filtering mode based on image type in accordance with the invention.

FIG. 2 is a flow chart of a method in accordance with the invention. First, if an image is selected to be scanned as a binary image (decision 200) then a fixed Laplacian filter is applied for all pixels (box 202). If the image is selected to be scanned as anything other than a binary image, a variable filter is applied on a pixel by pixel basis. If a pixel has a numerical value greater than a threshold (decision 204), a first value of K is used (box 206). If a pixel has a numerical value less than the threshold, a second value of K is used (box 208).

In a typical imaging system, the imaging device includes a processor and the digitized image may be sent to still another processor, for example in a host computer. The method of FIG. 2 may be performed by the processor in the imaging system, or in a separate computer. In the specific example embodiment, the imaging device includes special fast hardware for computation of convolution filters, so that the computation is preferably done in the imaging device.

Note that Laplacian operators have been used to illustrate the invention, but the method of FIG. 2 is applicable to any spatial filtering where the degree of filtering is made a function of image type.

The foregoing description of the present invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method of spatially filtering an image, the image comprising an array of pixels, each pixel having a numerical value that is a measure of light intensity, the method comprising the following steps:

(a) determining an image type;

(b) applying a fixed spatial filter to the numerical values of the array of pixels when the image type is binary; and (c) applying a variable spatial filter to the numerical values of the array of pixels, when the image is other than binary, as follows:

(c1) defining at least a first threshold range and a second threshold range;

(c2) reading the numerical value of a pixel;

(c3) applying the variable spatial filter, with a first central coefficient, to the numerical value of the pixel, when the numerical value is within the first threshold range;

(c4) applying the variable spatial filter, with a second central coefficient, to the numerical value of the pixel, when the numerical value is within the second threshold range; and (c5) repeating steps (c2) through (c4) for all pixels in the array.

2. The method of claim 1 where the fixed spatial filter and the variable spatial filter are both Laplacian filters.

* * * * *